Figures 1, 2, 3:
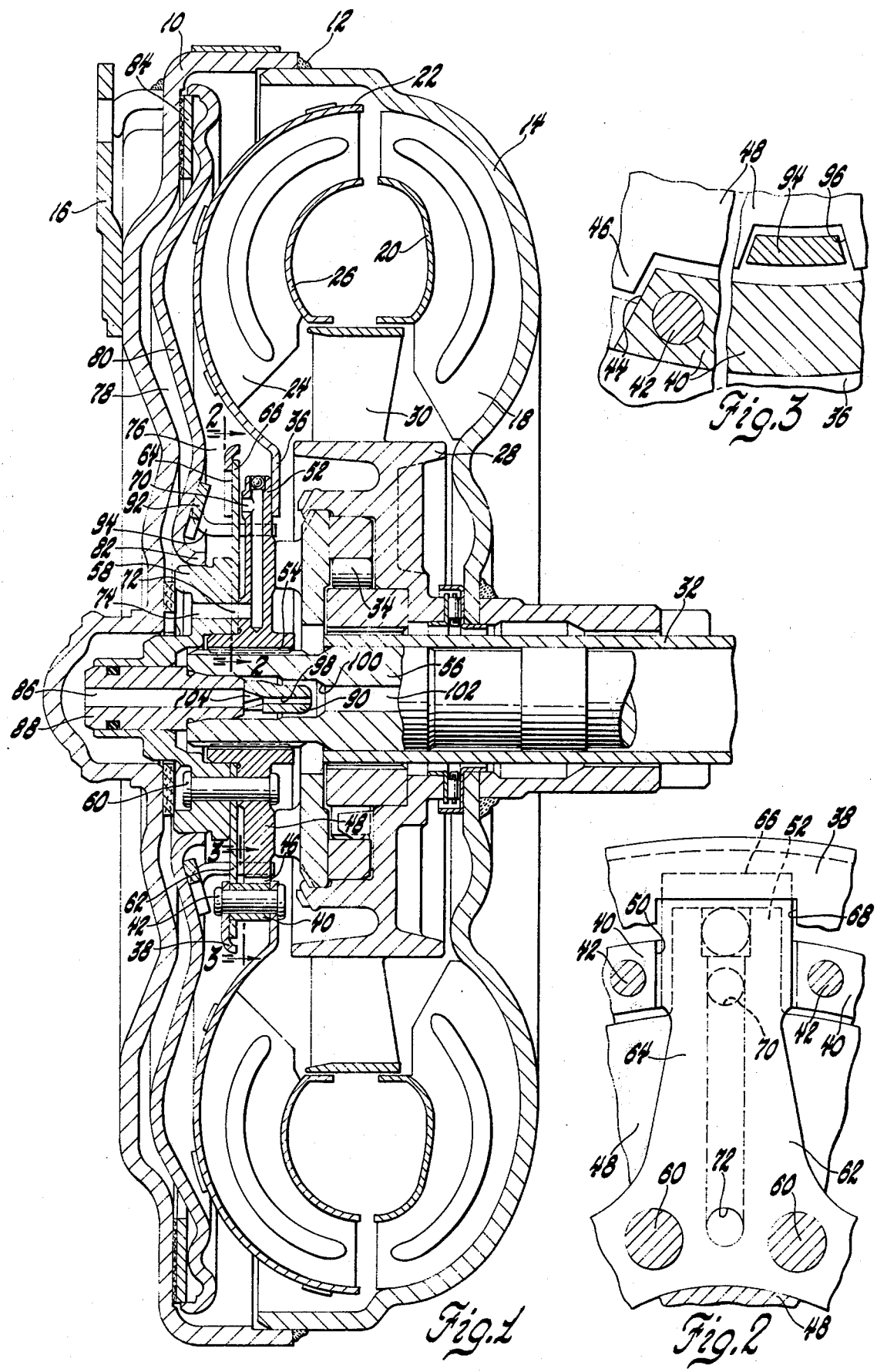

United States Patent [19]
Cheek

[11] 3,972,397
[45] Aug. 3, 1976

[54] TORQUE CONVERTER AND SLIPPING CLUTCH ASSEMBLY

[75] Inventor: Forrest R. Cheek, Detroit, Mich.

[73] Assignee: General Motors Corporation, Detroit, Mich.

[22] Filed: Aug. 11, 1975

[21] Appl. No.: 603,319

[52] U.S. Cl. ............................. 192/3.3; 192/70.19
[51] Int. Cl.² ................... F16D 39/00; F16D 47/06
[58] Field of Search ................. 192/3.29, 3.3, 3.31, 192/56 F, 54, 3.33; 74/733

[56] References Cited
UNITED STATES PATENTS 3,730,315  5/1973  Annis et al............................ 192/3.3

*Primary Examiner*—Benjamin W. Wyche
*Attorney, Agent, or Firm*—D. F. Scherer

[57] ABSTRACT

A torque converter and clutch assembly wherein the clutch is selectively maintained in slipping engagement with the torque converter input to provide a split torque drive in the assembly resulting in increased overall efficiency of the assembly. The engagement force of the clutch is proportional to the rearward axial thrust force on the turbine which thrust force is normally greatest when the converter is stalled and is imposed on a spring member which deflects proportionally to the thrust to control fluid flow to the disengagement side of the clutch through a variable restriction. The spring cooperates with a passage formed in the turbine hub, to form the variable restriction through which fluid must pass to enter the disengagement chamber of the clutch. The disengagement chamber has a fixed restriction exhaust passage so that the disengagement pressure is determined by the size of the variable restriction.

2 Claims, 3 Drawing Figures

TORQUE CONVERTER AND SLIPPING CLUTCH ASSEMBLY

This invention relates to torque converter and slipping clutch assemblies and more particularly to said assemblies wherein the clutch engagement is responsive to the axial thrust force on the turbine of the torque converter.

It has been disclosed in U.S. Pat. No. 3,693,478, issued to John Malloy, Sept. 26, 1972, and U.S. Pat. No. 3,730,315, issued to Robert Annis et al., May 1, 1973, that a slipping clutch disposed in parallel drive arrangement with a torque converter can be utilized to improve the overall efficiency of the torque converter. The Annis et al patent teaches that the axial thrust present on the turbine member of the torque converter can be used as an effective signal to control the desired slip speed of the clutch and torque converter. To utilize the turbine thrust as an effective signal it is necessary to include a resilient member in the turbine structure so that some flexibility is present within the system. The Annis et al. patent includes a spring as an integral portion of the turbine. In particular, the inner annular hub portion of the turbine shell is a spring. This requires that the turbine shell undergo proper heat treatment to provide the desired spring characteristics for the hub portion. The turbine shell is a relatively large component for heat treatment. The selective heat treatment of the hub portion only is difficult to achieve and heat treatment of the entire turbine shell is not wholly satisfactory.

The present invention seeks to provide, as a primary object thereof, an improved turbine structure in which the spring member is a component that can be heat treated separately prior to assembly of the turbine structure. To achieve this purpose, the turbine structure is comprised of a plurality of components which are secured together by mechanical fasteners, such as rivets, to form an assembly in which the turbine shell and spring have the necessary axial flexibility to establish the desired control function while maintaining sufficient torsional rigidity to provide an output drive.

The spring has a plurality of radially extending fingers one of which is disposed adjacent a fluid passage formed in the turbine drive hub, such that the spring finger and the passage cooperate in response to axial thrust on the turbine shell, to provide a variable flow restriction through which fluid is delivered to a disengagement chamber of the clutch thus controlling the effective engagement force on the clutch.

The clutch is sealingly slidably disposed on the turbine drive hub and is drivingly connected thereto by axially extending tangs which pass between the spring fingers and engage radial slots formed in the turbine drive hub.

It is therefore an object of this invention to provide an improved torque converter and slipping clutch assembly wherein the engagement force of the clutch is determined by the axial thrust on the turbine which is imposed on a separate spring component to control the engagement force on the clutch through control of fluid flow to the disengagement side of the clutch.

Another object of this invention is to provide an improved torque converter and slipping clutch assembly wherein the turbine is comprised of a turbine shell, a fingered flat spring and an output drive hub assembled so that the spring and turbine shell are movable axially, in response to thrust on the turbine shell, relative to the drive hub to control fluid flow through a passage in the drive hub, which flow is effective to control the effective engagement force of a clutch member slidably disposed on the drive hub and drivingly connected thereto by a plurality of drive tangs axially extending between the fingers of the spring.

These and other objects and advantages of the present invention will be more apparent from the following description and drawing in which:

FIG. 1 is a cross-sectional elevational view of a torque converter and clutch;
FIG. 2 is a view taken along line 2—2 of FIG. 1; and
FIG. 3 is a view taken along line 3—3 of FIG. 1.

Referring to the drawings, there is shown in FIG. 1 a torque converter and clutch assembly in which the torque converter has an input shell 10 welded at 12 to an impeller shell 14. The input shell 10 also has secured thereto a plurality of drive lugs 16 adapted to be connected to a prime mover, not shown. The impeller shell 14 includes a plurality of blades 18 which are secured to the shell 14 and an inner core member 20. The blades 18, shell 14 and core 20 combine to provide a semi-toroidal flow path. The other half of the toroidal flow path is formed by a turbine shell 22 to which is secured a plurality of blades 24, and a core 26 also secured to the blades 24. The turbine and impeller cooperate to form a conventional toroidal flow path which is well-known in the art of torque converters. The toroidal flow path also includes a stator 28 which incorporates a plurality of blades 30. The stator is drivingly connected to a stationary stator shaft 32 through a conventional one-way brake 34. The operation of the stator in providing torque multiplication is well-known and discussion thereof is not considered necessary for this disclosure.

The turbine shell 22 has an inner annular surface 36 which is connected to an annular spring-retainer 38 and a spacer 40 by a plurality of rivets 42. The spacer 40 has three recesses 44 spaced at 90° intervals which register with radial extensions 46 formed on a turbine hub 48. The spacer 40 has an opening 50, as seen in FIG. 2, which is spaced about either side of a radial extension 52 formed on the turbine hub 48. The extension 52 is spaced intermediate two of the radial extensions 46.

The turbine hub 48 is splined at its inner diameter 54, which splined portion is drivingly connected to a turbine output shaft 56 adapted to be connected to a conventional planetary gear type transmission, not shown. The turbine hub 48 is secured to a clutch support member 58 by a plurality of rivets 60. A flat spring member 62 is held between the turbine hub 48 and the clutch support hub 58 and has openings through which the rivets 60 pass. The spring 62 has four equally spaced fingers 64 which extend radially outward and are aligned with the radial extensions 46 and the radial extension 52, as shown in FIG. 2, of the turbine hub 48. The outer edge 66 of each spring finger 64 abuts the spring-retainer 38. As seen in FIGS. 1 and 2, the spring-retainer 38 has four equally spaced radial slots 68 so that the load on spring fingers 64 is limited to the outer periphery only, thereby providing a more consistent spring force in the system. The outer end of spring fingers 64 is wider than extension 52. On torque transmission by the turbine, the turbine shell 20 will transmit torque to spacer 40 through rivets 42. The spacer 40 will rotate slightly relative to spring fingers 64 until the side of opening 50 contacts fingers 64 so that the drive torque is transmitted to the spring 62 and then through rivets 60 to the turbine hub 48. Reverse torque, on coasting, is also transmitted through the spring 62.

The turbine hub 48 has formed therein a passageway 70 which is aligned at its inner end with an opening 72 formed in spring 62, and is also aligned with a passage 74 formed in the clutch support hub 58. One of the spring fingers 64 is in close proximity with opening of passage 70 at the radially outward end thereof so as to form a flow restriction at the inlet of passage 70 as will be explained later. As can be seen in FIG. 1, the passage 70 is opened to fluid which is located within the space 76 formed adjacent the turbine shell 22. This space will be denoted as the clutch apply chamber. The clutch apply chamber 76 is separated from a clutch release chamber 78 by a single plate clutch 80 which is sealingly slidably disposed, at its inner diameter 82, on the clutch support hub 58 and has formed on its outer periphery a clutch plate 84 which is adapted to frictionally engage the input shell 10. The passage 74 formed in the clutch support hub 58, which is an extension of passage 70, is in fluid communication with the disengage chamber 78 and is also in fluid communication through a passage 86 formed in a plug 88 with a restricted check valve 90. The clutch plate 80 has secured thereto four drive tangs 92 which have axially extending portions 94 which are drivingly connected to the turbine hub 48 through radially disposed drive slots 96 formed therein. As seen in FIG. 3, the drive slots 96 are spaced 45° from and intermediate the radial extensions 46 which are in interdigital relation with the slots 44 formed on the spacer 40.

As stated above, the use of axial thrust to control clutch engagement is disclosed in the Annis et al. U.S. Pat. No. No. 3,730,315. The axial thrust on turbine shell 22, caused by the fluid flow forces within the converter, are imposed upon the spring 62 through the fingers 64. As the thrust on the turbine shell 22 increases in a righthand or rearward direction, restriction to fluid flow into passage 70 is increased such that less fluid flows from the engage chamber 76 through passages 70 and 74 to the disengage chamber 78. The disengage chamber 78 has a fixed exhaust restriction 98 formed in the check valve 90. Thus when fluid flow is from chamber 76 to chamber 78, the check valve 90 will be moved to the right against a seat formed at 100 in a passage 102. When the check valve 90 is seated, the flow out of chamber 78 is through the restriction 98, this long restriction provides the temperature sensitive control such that on cold starts the restriction of fluid flow out of the disengage chamber 78 is much more restricted so that the disengagement pressure will remain higher during cold starts to limit the clutch engagement force. Under normal transmission operating conditions, however, the restriction 98 functions as desired to maintain the slip speed between the input shell 10 and the turbine hub 48 at a desirable level, such as 20 rpm. If the rearward thrust on the turbine shell 22 is decreased, the spring fingers 64 will move away from opening 70 to reduce the flow restriction such that more fluid flow will pass from chamber 76 to chamber 78. Since the output flow, from chamber 78, is through a fixed restriction, this will result in an increase in pressure in chamber 78 and therefore in a net decrease in the apply pressure of clutch 80.

When it is desired to maintain the clutch disengaged, fluid pressure is fed through passage 102 which causes check valve 90 to unseat. The fluid flow is then around the exterior of check valve 92 and unrestricted through a plurality of V-shaped groove openings 104 formed on the check valve 90. The flow-through grooves 104 passes through passage 86 into the disengage chamber 78. From the chamber 78, the fluid flows between the clutch surface 84 and the input shell 10 to maintain the clutch disengaged. The fluid then enters the torque converter between the impeller shell 14 and the turbine shell 22. A control for providing this type of flow is seen in the above-mentioned Annis et al patent.

Obviously, many modifications and variations are possible in light of the above-teachings. It is therefore to be understood that the invention may be practiced otherwise than as described within the scope of the appended claims.

What is claimed is:

1. A torque converter and clutch comprising; impeller means, a stator, a turbine in toroidal fluid flow relation with said impeller means and stator and including a turbine hub having fluid passage means formed therethrough and a splined inner diameter adapted to be drivingly connected to an output shaft, a clutch support hub having a smooth outer cylindrical surface, a flat spring disposed between said turbine hub and said clutch support hub having a plurality of radially extending spring fingers, one of said fingers being disposed in close proximity to one end of said fluid passage means, first fastener means for securing said turbine hub, said clutch support hub and said flat spring together, an annular spring retainer member abutting said spring fingers including a lip portion disposed circumjacent said spring fingers, a bladed turbine member having an annular surface, and a spacer member disposed between said spring retainer and said annular surface of said turbine member in interdigital relation with said turbine hub, second fastener means for securing said spring retainer, said bladed turbine member and said spacer member together; and clutch means sealingly axially slidably disposed on said cylindrical surface and being drivingly connected to said turbine hub for transmitting torque from said impeller means to said turbine hub in accordance with an axial engagement force determined by fluid flow through said fluid passage means, said turbine member being movable against said flat spring in response to the speed differential between said impeller and turbine to move said one spring finger relative to said one end of said fluid passage means whereby fluid flow through said fluid passage means is controlled to control the axial engagement force of said clutch means.

2. A torque converter and clutch comprising; impeller means, a stator, a turbine in toroidal fluid flow relation with said impeller means and stator and including a turbine hub having fluid passage means formed therethrough and a splined inner diameter adapted to be drivingly connected to an output shaft, a clutch support hub having a smooth outer cylindrical surface, a flat spring disposed between said turbine hub and said clutch support hub having a plurality of radially extending spring fingers, one of said fingers being disposed in close proximity to one end of said fluid passage, a variable restriction formed by said one finger and said fluid passage means, first fastener means for securing said turbine hub, said clutch support hub and said flat spring together, an annular spring retainer abutting said spring fingers including a lip portion disposed circumjacent said spring fingers, a bladed turbine member having an annular surface, and a spacer member disposed between said spring retainer and said annular surface of said turbine member in interdigital relation with said turbine hub, second fastener means for securing said spring retainer, said bladed turbine member and said spacer member together; and clutch means sealingly axially slidably disposed on said cylindrical surface and being drivingly connected to said turbine hub for transmitting torque from said impeller means to said turbine hub in accordance with an axial engagement force determined by the pressure drop across said variable restriction, said spring retainer being movable against said flat spring in response to the speed differential between said impeller and turbine to move said one spring finger relative to said one end of said fluid passage means whereby fluid flow through said variable restriction is controlled to control the axial engagement force of said clutch means.

* * * * *